(12) United States Patent
Hayes et al.

(10) Patent No.: US 11,945,978 B2
(45) Date of Patent: Apr. 2, 2024

(54) HOT MELT ADHESIVE COMPOSITION AND USE THEREOF

(71) Applicants: HENKEL IP & HOLDING GMBH, Duesseldorf (DE); PURAC BIOCHEM B.V., Gorinchem (NL); INGEVITY UK LTD., Warrington (GB)

(72) Inventors: Patrick Hayes, Stratford (CA); Michael Harwell, Flemington, NJ (US); Jennifer Plummer, Belle Mead, NJ (US)

(73) Assignees: Henkel AG & CO. KGaA, Duesseldorf (DE); Ingevity UK LTD., Warrington (GB); PURAC Biochem B.V., Gorinchem (NL)

( * ) Notice: Subject to any disclaimer, the term of this patent is extended or adjusted under 35 U.S.C. 154(b) by 546 days.

(21) Appl. No.: 17/343,898

(22) Filed: Jun. 10, 2021

(65) Prior Publication Data
US 2021/0292619 A1 Sep. 23, 2021

Related U.S. Application Data

(63) Continuation of application No. PCT/EP2019/085975, filed on Dec. 18, 2019.

(60) Provisional application No. 62/783,249, filed on Dec. 21, 2018.

(51) Int. Cl.
*C09J 167/04* (2006.01)

(52) U.S. Cl.
CPC .................. *C09J 167/04* (2013.01)

(58) Field of Classification Search
CPC ................. C09J 167/04; C08L 67/04
See application file for complete search history.

(56) References Cited

U.S. PATENT DOCUMENTS

| 5,169,889 | A | 12/1992 | Kauffman et al. |
| 5,252,646 | A | 10/1993 | Iovine et al. |
| 5,312,850 | A | 5/1994 | Iovine et al. |
| 2017/0037218 | A1* | 2/2017 | Kadoma ................ C08K 5/10 |
| 2018/0282599 | A1* | 10/2018 | Schaekens ............. C08G 63/08 |

FOREIGN PATENT DOCUMENTS

| JP | 5-339557 A | 12/1993 |
| WO | 9510577 A1 | 4/1995 |
| WO | 2014074115 A1 | 5/2014 |
| WO | 2015150580 A1 | 10/2015 |
| WO | 2017055044 A1 | 4/2017 |
| WO | 2017055045 A1 | 4/2017 |
| WO | 2017149019 A1 | 9/2017 |

OTHER PUBLICATIONS

Arvanitoyannis, Ioannis et al. "Synthesis and degradability of a novel aliphatic polyester based on L-lactide and sorbitol:3" Polymer, vol. 37, No. 4, 1996, pp. 651-600. Polymer vol. 37, No. 4, 1996, pp. 651-660.

Hao, Q. et al. "Preparation and crystallization kinetics of new structurally well-defined star-shaped biodegradable poly (L-lactide)s initiated with diverse natural sugar alcohols" Biomacromolecules 2005, 6, 4, 2236-2247.

* cited by examiner

*Primary Examiner* — Mark S Kaucher
(74) *Attorney, Agent, or Firm* — Sun Hee Lehmann

(57) ABSTRACT

The invention is related to fast setting, bio-based hot melt adhesive compositions and use thereof. The bio-based hot melt adhesive compositions are based on renewable-based feedstock, making them environmentally friendly, and particularly suitable for sealing cardboard case, carton, and cardboards.

15 Claims, No Drawings

HOT MELT ADHESIVE COMPOSITION AND USE THEREOF

FIELD OF THE INVENTION

The invention relates to fast setting, bio-based hot melt adhesives. The fast setting, bio-based hot melt adhesives are particularly useful as packaging adhesives with high green strength and develop rapid adhesion onto substrates.

BACKGROUND OF THE INVENTION

Hot melts are room temperature solid, water and solvent-free adhesives that are applied as melt onto the substrates and set by solidifying upon cooling. For some applications, hot melt adhesives require strong adhesion immediately after the bond is made and strong green strength is required, especially for packaging case, cartons and carboards. Once the hot melt adhesives solidify, the adhesives set and permanently bond the substrates together.

Conventional hot melt adhesives are petrochemical-based that utilize energy-intensive processes. In addition, a large percentage of the petroleum must be transported from various parts of the world, which increases carbon footprint. Generally, very few raw materials in hot melt adhesives are made from renewable resources, and thus, hot melts have a negative impact on the environment. There is an increased desire to reduce carbon footprint and to produce environmentally sound hot melt adhesives. For products touted as environmentally sound packages, it is desirable to also contain environmentally sound adhesives in the packages. One method of making an environmentally sound adhesives is to decrease carbon footprint by forming the hot melt adhesive from all or high renewable resource content.

Adhesives made from all or high renewable resource content have their challenges, ranging from phase separation, brittleness and thermal instability, as documented in U.S. Pat. Nos. 5,252,646, 5,312,850, 5,252,646 and 5,169,889.

Simply put, bio-based adhesives do not perform as well as petroleum-based adhesives. Particularly, bio-based adhesives that provide high green strength is elusive and desirable. There is a need in the art for bio-based hot melt adhesives that provides high green strength. The current invention addresses this.

SUMMARY OF THE INVENTION

The present invention relates to bio-based hot melt adhesive compositions that provide high green strength and fast setting.

In one embodiment, the bio-based hot melt adhesive composition comprises a mixture of a polylactic acid-based polymer, a polylactic acid-based bio-nucleator, a polylactic acid-based bio-tackifier, and a polylactic acid-based bio-wax.

In another embodiment, the bio-based hot melt adhesive composition comprises at least two polylactic acid-based polymers, wherein the first polymer comprises lactic acid and caprolactone, having a low number average molecular weight (Mn) of about 10 to about 20 kg/mol; and the second polymer made of lactic acid, having a high number average molecular weight of about 45 to about 85 kg/mol. The ratio of the low molecular weight polylactic acid-based polymer to the high molecular weight polylactic acid-based polymer ranges from about 4:1 to about 10:1.

In a further embodiment, the bio-based hot melt adhesive composition comprises a mixture of polylactic acid-based polymers having a bimodal number average molecular weight distribution, where the first peak distribution ranges from about 10 to about 20 kg/mol and the second peak distribution ranges from about 45 to about 85 kg/mol. The first polymer is a block copolymer made of (i) amorphous lactic acid and caprolactone and (ii) having of crystalline lactic acid; and the second polymer is made of polylactic acid, and is substantially free of caprolactone monomers. The ratio of the first to the second peak is from about 4:1 to about 10:1. The bio-based hot melt adhesive composition further comprises a bio-nucleator, a bio-tackifier, and a bio-wax.

The above bio-based hot melt adhesive compositions have high initial green strength with a set time of about five seconds or less and a viscosity range of about 1000 to about 5000 cPs at 177° C.

DETAILED DESCRIPTION OF THE INVENTION

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of and "consisting essentially of the enumerated ingredients/steps, which allows the presence of only the named ingredients/steps, along with any impurities that might result therefrom, and excludes other ingredients/steps.

Numerical values in the specification and claims of this application, particularly as they relate to polymers, polymer compositions or adhesive compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values. As used herein, approximating language may be applied to modify any quantitative representation that may vary without resulting in a change in the basic function to which it is related. Accordingly, a value modified by a term or terms, such as "about," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11", and "about 1" may mean from 0.9-1.1. Other meanings of "about" may be apparent from the context, such as rounding off, so, for example "about 1" may also mean from 0.5 to 1.4.

As used herein, a polymer or an oligomer is a macromolecule that consists of monomer units that is equal to or greater than about one monomer unit. Polymer and oligomer, or polymeric and oligomeric, are used interchangeably here in the invention.

The "green strength" herein refers to the ability of an adhesive to hold two substrates together when brought into contact and before the adhesive develops its ultimate bond properties when fully cured.

The present invention relates to a bio-based hot melt adhesive composition that provides high green strength, having a set time of about five seconds or less. The bio-based hot melt adhesive composition comprises a mixture of a polylactic acid-based polymers, polylactic acid-based bio-tackifier, a polylactic acid-based bio-nucleator, and a polylactic acid-based bio-wax.

The polymers of the bio-based hot melt adhesive are selected from bio-based resins. Non-limiting bio-based polymers include biodegradable polylactic acid polymer, specifically, a mixture of poly-L-lactic acid and poly-D-lactic acid copolymer. It is also envisioned that the bio-based resins could also be formed from polyester, caprolactone copolymers, polycaprolactone, and carbodiimide stabilized caprolactone-lactide random copolymer.

To increase the initial green strength of the adhesive, it has been discovered that a mixture of at least two polylactic acid-based biopolymers having two different number average molecular weights, and a bio-nucleator aids in decreasing the open time to about five seconds or less. In another embodiment, the polylactic acid-based polymer is a single polymer with a bimodal weight distribution.

The first biopolymer is a polylactic acid polymer having a number average molecular weight of about 10 to about 20 kg/mol.

The first polymer is a block copolymer of amorphous blocks and crystalline blocks, as described in WO 2017149019, incorporated herein. In one embodiment, the first polymer is a block copolymer comprising a first block made by amorphous copolymers of lactic acid and caprolactones, and a second block made of crystalline polymers of lactic acid. The block copolymer may further comprise of polymerizable monomers which can polymerize with lactic acid (or lactide). Examples of suitable monomers include glycolic acid, succinic acid, triethylene glycol, caprolactone, and other cyclical esters such as glycolide. The lactic acid in the first block can be D-lactic acid, L-lactic acid, and combinations thereof. The use of L-lactic acid may be preferred in view of its wide availability.

In one embodiment the first block of the copolymer comprises 10-90 wt. % of monomer derived from lactic acid and 90-10 wt. % of further polymerizable monomer. Combinations of more than one type of further polymerizable monomer are also possible. It may be preferred for the first block to comprise 25-75 wt. % of monomer derived from lactic acid and 75-25 wt. % of further polymerizable monomer. It is considered particularly preferred for the first block to comprise 25-75 wt. % of monomer derived from L-lactic acid and 75-25 wt. % of caprolactone.

The first block is an amorphous polymer. The amorphous polymer is a polymer which shows an enthalpy of melting of at most 2.0 J/gram. This can be determined by DSC measurement. It is preferred for the amorphous copolymer in the block copolymer to have an enthalpy of melting of at most 1.0 J/gram, as a lower degree of crystallinity, as is evidenced from a lower enthalpy of melting, is believed to prevent the adhesive from becoming brittle and to result in a hot-melt adhesive with better adhesion properties. The enthalpy of melting of the first block can be determined after synthesis of the first block or, for an existing polymer, by synthesizing a replicate block.

The second block in the block copolymer is a polylactic acid polymer block selected from a poly-L-lactic acid (PLLA) block and a poly-D-lactic acid (PDLA) block. The term polylactic acid polymer block (PLA) refers to a polymer block comprising at least 80 wt. % of lactic acid monomers, in particular at least 90 wt. %, more in particular at least 95 wt. % of lactic acid monomers. The polylactic acid polymer block always has a higher lactic acid contain that the first copolymer block, in general at least 10 wt. % higher, calculated on the weight of the total copolymer, in particular at least 15 wt % higher.

A poly-L-lactic acid block (PLLA) is defined as a PLA in which at least 90% of the lactic acid monomers are L-lactic acid monomers, in particular at least 95%, more in particular at least 98%. Conversely, a poly-D-lactic acid block (PDLA) is defined as a PLA in which at least 90% of the lactic acid monomers are D-lactic acid monomers, in particular at least 95%, more in particular at least 98%. Higher percentages are preferred as they will result in an increased crystallinity of the PLA block.

The weight ratio between the first block in the copolymer and the second block in the copolymer generally is such that the second block makes up 10-90 wt. % of the total of first block and second block, in particular 15-80 wt. %. It may be preferred for the second block to make up 20-60 wt. % of the total weight of the polymer, in some embodiments 25-40 wt. %.

The number average molecular weight of the block copolymer generally is between about 10 to about 20 kg/mol.

A non-limiting example of the first copolymer includes CORIBION LUMINY L, LX and D series and PURALACT L resin.

The second biopolymer has a higher number average molecular weight than the first biopolymer. The second biopolymer is also selected from biodegradable and biocompatible polymers produced from renewable sources, and are polyesters such as polycaprolactone, poly-vinyl alcohol, polyglycolic acid, and polylactic acid. In one embodiment, the second biopolymer is a polylactic acid having a number average molecular weight range of about 45 to about 85 kg/mol. The second polylactic acid polymer is a semi-crystalline biopolymer. In one embodiment, the second biopolymer is made of polylactic acid and is substantially free of any caprolactone monomers. Preferably, the second biopolymer is completely free of caprolactone and is made entirely of polylactic acid monomers.

Preferred second biopolymers has a melt index less than 100 g/10 min (210° C.), measured in accordance with ASTM D 1238 and a Tg value of less than about 80° C., measured in accordance with ASTM D3417. A non-limiting example of second biopolymer includes INGEO BIOPOLYMER series: 10361D, 2002D, 3D870, 8052D, 7001D, 6362D, 3001D, 2003D, 8052D, 4060D, and 4043D from NatureWorks.

The ratio of the first biopolymer to the second biopolymer ranges from about 4:1 to about 10:1.

In another embodiment, the biopolymer is a polylactic acid-based polymer or mixtures of polylactic acid-based polymers with a bimodal number average molecular weight distribution with one peak ranging at around 10 to about 20 kg/mol, and another peak at around 45 to about 85 kg/mol. The weight ratio of the first peak to the second peak ranges from about 4:1 to about 10:1.

A bio-nucleator is added to the mixture of polylactic acid-based polymer to form the hot melt adhesive. Like the biopolymers, bio-nucleators may also be produced from other polyesters such as poly-vinyl alcohol and polyglycolic acid. The bio-nucleator is formed from PDLA (poly-D-lactic acid block) based materials.

This bio-nucleator, when incorporated in the above biopolymers, forms nuclei for crystal growth, also known as spherulites, in the biopolymer melt. Spherulites are rounded aggregate of crystal structures with spherule textures, occurred by growing of lamellae with specific arrangement from crystal nucleus, and are observed by optical microscopy and cross polarized light. The number average molecular weight of the bio-nucleators range from about 0.75 to about 10 kg/mol. The bio-nucleator has a high melt temperature, ranging from about 120° C. to about 200° C., measured by DSC. The bio-nucleator is also crystalline and has an enthalpy of about 25 to about 75 J/g, but no discernable Tg, measured by DSC.

Preferred bio-nucleators are poly-D-lactic acids, and include, for example, PDS LUMNIY series from TotalCorbion, including L105, L130, L175, LX175, LX530, LX575, LX930, LX975, LX175U, LX130U, LX930U, D070 and D120.

The bio-based adhesive composition further comprises an amorphous bio-tackifier. The bio-tackifier has low, an enthalpy of melting of less than about 2.5 J/g, preferably less than about 2 J/g, and more preferably less than about 1.5 J/g; or no discernable melt temperature nor heat of enthalpy when measured by DSC, using a heat-cool-heat cycle at −50° C., heating at 10° C./min up to 220° C., then cooling at the same rate and repeating the first heating step. In addition, the bio-tackifiers have a glass transition temperature (Tg) of greater than about 30° C., preferably greater than about 35° C., and more preferably greater than about 40° C. The amorphous bio-tackifier has a number average molecular weight of about 1,000 to about 10,000 g/mol. Exemplarily bio-tackifiers include tackifiers made from mixtures of random enantiomers of poly lactic acid block.

Less than 10, preferably less than 5, and more preferably essentially zero weight percent of non-polylactic acid-based tackifiers may be added to the hot melt adhesive, since they can cause phase separation to the poly lactic acid-based components in the adhesive.

The bio-based adhesive composition further comprises a bio-wax, also made from polylactic acid-based material, specifically poly-L-lactic acids (PLLA). The number average molecular weight of the bio-wax ranges from about 0.75 to about 10 kg/mol. Again, the bio-wax may also be produced from other polyesters such as polycaprolactone, polyvinyl alcohol, and polyglycolic acid. The bio-wax has a melting temperature ranging from about 120° C. to about 200° C., Tg of about 5° C. to about 50° C. and melt enthalpy of about 25 to about 75 J/g, measured by DSC.

The bio-nucleator has opposite enantiomer structure than the bio-wax in the hot melt adhesive. In one embodiment, the bio-nucleator is PDLA-based and the bio-wax is PLLA-based. It is also envisioned that if the bio-nucleator is PLLA-based, then the bio-wax is PDLA-based, tackifers of PLA which comprise both enantiomers of the lactic acid units (D-lactic and L-lactic) in a significant amount (at least 5 wt. % of the minor enantiomer) whereby the enantiomers are randomly distributed in the PLA.

The bio-based hot melt adhesive of the invention may optionally include additives. Additives include antioxidants, plasticizers, pigments, brightening agents, colorants, fluorescing agents, dyestuffs, fillers, flow and leveling agents, wetting agents, surfactants, plasticizers, antifoaming agents, rheology modifiers, emulsifiers, humectants, gelling agent, colorants, other surface modifying agents, fragrances, and permeation enhancers. Preferably, the additives are also bio-based.

Additives may be incorporated in minor amounts, i.e., up to about 10% by weight, preferably less than about 5% by weight, more preferably less than about 2% by weight, into the adhesives of the present bio-based adhesive composition. Addition of any significant amount, e.g., greater than 5 wt. %, 4 wt. %, 3 wt %, 2 wt. % or 1 wt. %, of non-lactic acid-based components will lead to phase separations of the adhesive.

The set time of the bio-based adhesive is about 5 seconds or less. In another embodiment, the set time of the bio-based adhesive is about 3 seconds or less. The adhesive is especially suitable for container labels, and carton and case sealing adhesives. The adhesive is also useful as sealing adhesives, including heat sealing applications, for example, in packaging of cereals, cracker and beer products. Encompassed by the invention are containers, e.g., cartons, cases, boxes, bags, graphic arts, sealers, trays and the like, wherein the adhesive is applied by the manufacturer thereof prior to shipment to the packager. The adhesive also find use as label, bookbinding, bag or disposable article adhesives. Quick setting or short set time allows faster throughput of boxes and articles, without the need to apply pressure onto packages to form the final setting.

The set time of the adhesive must be balanced with acceptable viscosity. The acceptable viscosity of the hot melt adhesive ranges from about 800 to about 5000 cPs, preferably from about 1000 to about 3,500 cPs at 177° C. Lower viscosity tends to hinder accurate application while higher viscosity tends to impair hot melt applicators.

The total amount of the bio-tackifiers and bio-waxes is present whereby the viscosity of the adhesive is from about 800 to about 5,000 cPs, more preferably from about 1000 to about 3500 cPs at 177° C. Preferably the total amount of the bio-tackifier and the bio-wax in the adhesive is greater than about 35 wt. %, based on the total weight of the adhesive. Surprisingly, no negative impact on level of adhesion over a wide range of temperatures. Adhesive formed with large quantities of low molecular weight and high Tg materials, e.g., tackifiers and waxes, can harm low temperature adhesion.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

Examples

Comparative A and Sample 1 were made at 177° C. by adding, in the order of, tackifier, nucleator, wax, and polymer. All materials except PLA polymer were from Total-Corbion; and the PLA polymer is commercially available from NatureWorks.

TABLE 1

|  | Comparative A | Sample 1 |
|---|---|---|
| Lactide-Caprolactone bio-polymer, viscosity 10600 mPas at 163° C./Tg 10° C. by DSC, melt enthalpy 15.1 J/g | 68.8 | 45.5 |
| PLLA bio-wax, Melt Temperature 147° C. by DSC, Tg 21° C. by DSC, melt enthalpy 42 J/g | 7.8 | 21.5 |
| PDLA bio-Nucleator, Melt Temperature 154° C. by DSC, no discernable Tg by DSC, melt enthalpy 44 J/g; | 2.8 | 2.8 |
| Amorphous PLA bio-tackifier, no discernable melt temperature by DSC, Tg 33° C. by DSC, no discernable melt enthalpy by DSC | 20.6 | 22.2 |
| PLA polymer, Ingeo Biopolymer 10361D | 0 | 8 |
| Total | 100.0 | 100.0 |
| Viscosity @ 177° C. | 2,300 cPs | 2,335 cPs |
| Kanebo set time at 350° F. application temperature | 7 seconds | 4 seconds |

Viscosity of the above sample was measured by Brookfield Viscometer (model DV1), with spindle #27 at 177° C. Targeted viscosity ranges from about 800 to about 3,500 cPs at 177° C.

Comparative Sample A, while provided good viscosity, had a set time greater than about 5 seconds. Sample 1, with bimodal Mn polylactic acid polymers provided acceptable viscosity and set time value of about 5 seconds or less. Addition of larger quantities of PLA polymers led to a viscosity greater than 3,500 cPs at 177° C., and thus, were not further tested.

Set time was measured on a Kanebo (ASM-15N) bond testing machine. A 2×2" piece of single flute corrugate was mounted into the compression sleeve. A 2×5" piece of single flute corrugate was placed on a conveying belt. A machine hot melt tank was charged with Comparative A adhesive listed above. The adhesive was heated to 177° C. The computer controls were adjusted such that the nozzle at the bottom of the tank dispensed the required deposition of hot melt in bead form having a bead width of about 0.09 to about 0.11 inches. A suitably short open time was programmed into the machine and the set time to be evaluated was also inputted. The machine started and the conveyor moved the 2×5" piece of corrugate under the extruding bead of molten hot melt. It reached the end of the conveyor and after the desired open time was reached, the compression sleeve moved down to mate the 2×2" pieces of corrugate with the 2×5" piece of corrugate. The pieces were held under 1 Kg of compression force for the desired set time and then the machine automatically pulled the bond apart. The set time was determined through repeated runs. It was determined to the be the minimum time for which the bonds consistently showed greater than 75% fiber tear after pulled apart. This was determined by visual observation of the machine operator. This was then repeated for Sample 1.

The average fiber tear was also measured. Using the above method, the percent of fibers left on the corrugated substrate was measured at various temperatures listed in Table 2. An average of three bonds are listed in Table 2. The higher the level of fiber tear indicated better adhesion at the measured temperature.

TABLE 2

| Test Temperature (° F./° C.) | Comparative A | Sample 1 |
|---|---|---|
| 0/−18 | 95 | 95 |
| 40/4.4 | 90 | 95 |
| 72/22 | 100 | 100 |
| 120/49 | 100 | 100 |
| 140/60 | 100 | 100 |

As shown in Table 2, adhesion for the Sample was similar and/or better than the Comparative sample at low temperatures. Even with higher quantities of low molecular weight tackifiers and waxes, Sample's adhesion remained substantially the same as Comparative Sample's adhesion.

The invention claimed is:

1. A hot melt adhesive composition:
   a) a mixture of bio-based polymer;
   b) a poly-D-lactic acid block-based bio-nucleator;
   c) an amorphous polylactic acid-based bio-tackifier; and
   d) a poly-L-lactic acid block-based bio-wax;
   wherein the mixture of bio-based polymer comprises a first polylactic acid-based polymer having a Mn (number average molecular weight) of about 10 to about 20 kg/mol and a second polylactic acid-based polymer having Mn of about 45 about 85 kg/mol; and
   wherein the viscosity of the hot melt adhesive ranges from about 800 to about 5,000 cPs at 177° C., measured by Brookfield Viscometer (model DV1), with spindle #27 at 177° C.

2. A hot melt adhesive composition comprising:
   a) a first polylactic acid based polymer of lactic acid and caprolactone copolymer resin, having a Mn (number average molecular weight) of about 10 to about 20 kg/mol;
   b) a second polylactic acid-based polymer of lactic acid, having a Mn of about 45 about 85 kg/mol;
   c) a poly-D-lactic acid block-based bio-nucleator;
   d) an amorphous polylactic acid-based bio-tackifier; and
   e) a poly-L-lactic acid block-based bio-wax;
   wherein the ratio of the first polylactic acid-based polymer and the second polylactic acid-based polymer is from about 4:1 to about 10:1;
   wherein the combined amount of the bio-tackifier and the bio-wax is greater than 35 wt %, based on the total weight of the adhesive;
   wherein the set time of the hot melt adhesive composition is 5 seconds or less, measured on a Kanebo (ASM-15N) bond testing machine; and
   wherein the viscosity of the hot melt adhesive ranges from about 800 to about 2500 cPS at 177° C., measured by Brookfield Viscometer (model DV1), with spindle #27 at 177° C.

3. The hot melt adhesive composition of claim 2, comprising an additive, where the additive is less than 5 wt %, based on the total weight of the adhesive.

4. The hot melt adhesive composition of claim 3, where the additive is less than 2 wt. %, based on the total weight of the adhesive.

5. The hot melt adhesive composition of claim 4, wherein the adhesive is essentially free of any additives.

6. The hot melt adhesive composition of claim 2, wherein the set time of the adhesive is 3 seconds or less, measured on a Kanebo (ASM-15N) bond testing machine.

7. A hot melt adhesive composition comprising:
a) a first polylactic acid-based polymer, which is a block copolymer comprising a (i) first block of amorphous copolymer of lactic acid and caprolactone and (ii) second block of crystalline polymer of lactic acid, having a Mn (number average molecular weight) of about 10 to about 20 kg/mol;
b) a second polylactic acid based polymer, which is substantially free of caprolactone monomers, having a Mn of about 45 about 85 kg/mol
c) a poly-L-lactic acid block-based bio-nucleator;
d) an amorphous polylactic acid-based bio-tackifier; and
e) a poly-D-lactic acid block-based bio-wax;
wherein the ratio of the first polylactic acid-based polymer the second polylactic acid-based polymer is from about 4:1 to about 10:1;
wherein the combined amount of the bio-tackifier and the bio-wax is greater than 35 wt %, based on the total weight of the adhesive;
wherein the set time of the hot melt adhesive composition is 5 seconds or less, measured on a Kanebo (ASM-15N) bond testing machine; and
wherein the viscosity of the hot melt adhesive ranges from about 800 to about 2500 cPS at 177° C., measured by Brookfield Viscometer (model DV1), with spindle #27 at 177° C.

8. The hot melt adhesive composition of claim 7, comprising an additive, where the additive is less than 5 wt. %, based on the total weight of the adhesive.

9. The hot melt adhesive composition of claim 8, where the additive is less than 2 wt. %, based on the total weight of the adhesive.

10. The hot melt adhesive composition of claim 9, wherein the adhesive is essentially free of any additives.

11. The hot melt adhesive composition of claim 7, wherein the set time of the adhesive is 3 seconds or less, measured on a Kanebo (ASM-15N) bond testing machine.

12. An article comprising the hot melt adhesive composition of claim 2.

13. The article of claim 12, which is a case, carton, tray, label, bookbinding, bag or disposable article.

14. An article comprising the hot melt adhesive composition of claim 7.

15. The article of claim 14, which is a case, carton, tray, label, bookbinding, bag or disposable article.

* * * * *